United States Patent
Liu

(10) Patent No.: US 12,047,296 B2
(45) Date of Patent: Jul. 23, 2024

(54) SCALABLE LOSS TOLERANT REMOTE DIRECT MEMORY ACCESS OVER OPTICAL INFRASTRUCTURE WITH SHAPED QUOTA MANAGEMENT

(71) Applicant: VISCORE TECHNOLOGIES INC., Nepean (CA)

(72) Inventor: Yunqu Liu, Kanata (CA)

( * ) Notice: Subject to any disclaimer, the term of this patent is extended or adjusted under 35 U.S.C. 154(b) by 0 days.

(21) Appl. No.: 17/812,673

(22) Filed: Jul. 14, 2022

(65) Prior Publication Data

US 2023/0060893 A1 Mar. 2, 2023

Related U.S. Application Data

(60) Provisional application No. 63/232,325, filed on Aug. 12, 2021.

(51) Int. Cl.
*H04L 67/141* (2022.01)
*G06F 15/173* (2006.01)
*H04L 47/12* (2022.01)

(52) U.S. Cl.
CPC ........ *H04L 47/12* (2013.01); *G06F 15/17331* (2013.01)

(58) Field of Classification Search
CPC ..... H04L 47/12; H04L 47/2433; H04L 47/24; H04L 67/141; H04L 49/358; H04L 49/70; G06F 15/17331; G06F 2009/45595; G06F 2009/45583; H04W 28/0983
See application file for complete search history.

(56) References Cited

U.S. PATENT DOCUMENTS

| 7,620,693 B1 * | 11/2009 | Mott | H04L 67/1097 710/22 |
| 2021/0152494 A1 * | 5/2021 | Johnsen | H04L 47/2433 |
| 2022/0291875 A1 * | 9/2022 | Diaz-Cuellar | G06F 3/0664 |

FOREIGN PATENT DOCUMENTS

| CN | 109417514 A | * | 3/2019 | ............ G06F 13/28 |
| CN | 113438182 A | * | 9/2021 | |
| WO | WO-2013134732 A1 | * | 9/2013 | ............ H04J 3/1629 |
| WO | WO-2022179417 A1 | * | 9/2022 | ........... G06F 15/173 |
| WO | WO-2023016646 A1 | * | 2/2023 | |

* cited by examiner

*Primary Examiner* — Alina A Boutah
(74) *Attorney, Agent, or Firm* — Rosenberg, Klein & Lee

(57) ABSTRACT

Remote Direct Memory Access (RDMA) over Internet Protocol and/or Ethernet has gained attention for datacenters. However, the sheer scale of the required RDMA networks presents a challenge. Accordingly, optical infrastructures wavelength division multiplexing within a datacenter environment have also gain attention through the wide low cost bandwidth it offers with easy expansion within this environment. However, latency is a significant issue for many applications rather than bandwidth between devices. Accordingly the inventors have established a design methodology where the network prioritises latency over bandwidth where bandwidth utilization and management offer reduced latency for such applications. Accordingly, the inventors exploit loss-tolerant RDMA architectures with quota-based traffic control, message level load balancing and a global view of virtual connections over commodity switches with simple priority queues.

3 Claims, No Drawings

ABSTRACT# SCALABLE LOSS TOLERANT REMOTE DIRECT MEMORY ACCESS OVER OPTICAL INFRASTRUCTURE WITH SHAPED QUOTA MANAGEMENT

CROSS-REFERENCE TO RELATED APPLICATIONS

This patent application claims the benefit of priority from U.S. Provisional Patent Application 63/232,325 filed Aug. 12, 2021; the entire content of which are incorporated herein by reference.

FIELD OF THE INVENTION

This patent relates to data transmission via Internet Protocol and/or Ethernet and more particularly to systems, methods and architectures exploiting optical infrastructure to provide scalable loss tolerant Remote Direct Memory Access (RDMA) across a network with an emphasis on latency reduction.

BACKGROUND OF THE INVENTION

Remote Direct Memory Access (RDMA) is process providing direct memory access from the memory of one computer into that of another without involving either one's operating system. As such RDMA supports zero-copy networking by enabling the network adapter to transfer data from a network directly to application memory or from application memory directly to the network, thereby eliminating the need to copy data between application memory and the data buffers in the operating system. Such transfers require no work to be done by CPUs, caches, or context switches, and transfers continue in parallel with other system operations. This reduces latency in message transfer.

Since 2018, RDMA has achieved broad acceptance as implementation enhancements enabled improved performance over ordinary networking infrastructure. For example, RDMA over Converged Ethernet (RoCE) is able to run over lossless Ethernet (with Priority-based Flow Control (PFC) and/or Data Communication Network (DCN) functions enabled) infrastructures and iWARP enables an Ethernet RDMA implementations at the physical layer using Transmission Control Protocol (TCP)/Internet Protocol (IP) as the transport. However, these solutions are typically employed in small scale networks.

RDMA over Internet Protocol and/or Ethernet has recently gained attention for datacenters. However, with micro-datacenters comprising 500 racks with 30 1 U servers per rack. i.e. 15,000 servers, through to large datacenters with 10,000 racks or more, i.e. 300,000 servers, then the sheer scale of the required RDMA networks presents a challenge.

Optical infrastructures exploiting wavelength division multiplexing (WDM) within a datacenter environment provide per wavelength bandwidths of 10 Gb/s, 25 Gb/s, 40 Gb/s and above with per fiber bandwidths of 400 Gb/s, 1 Tb/s and above. As such bandwidth is cheap and easy to increase within this environment.

However, latency is a significant issue for many applications and accordingly the inventors have established a design methodology where the network prioritises latency over bandwidth. Embodiments of the invention exploiting lower bandwidth utilization can achieve latency near to that of an empty queue.

The design methodology of the inventors supports the core value-propositions for a RDMA network within a datacenter for the datacenter network owners, these being scalability, ubiquitous deployment, and maintenance-free operation. To implement this methodology the inventors have established a loss-tolerant RDMA L4 architect with a layer-4 (L4) transport employing quota-based traffic control, message level load balancing and a global view of virtual connections over commodity switches that has simple priority queues.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to data transmission via Internet Protocol and/or Ethernet and more particularly to systems, methods and architectures exploiting optical infrastructure to provide scalable loss tolerant Remote Direct Memory Access (RDMA) across a network with an emphasis on latency reduction.

In accordance with an embodiment of the invention there is provided a method comprising:
implementing a plurality of remote direct memory access (RDMA) processes across a network connecting a plurality of electronic devices; and
providing one or more controllers to control the network; wherein
the one or more controllers control each RDMA process of the plurality of RDMA processes is based upon the assumption that the receiver associated with that RDMA process of the plurality of RDMA processes is the bottleneck in that RDMA process of the plurality of RDMA processes which defines the speed at which that RDMA process of the plurality of RDMA processes proceeds.

In accordance with an embodiment of the invention there is provided a method comprising:
determining a bandwidth of a receiver within a network;
establishing a predetermined factor of the bandwidth of the receiver as a quota;
establishing a set of virtual connections (VCs), each VC of the set of VCs between a predetermined transmitter and the receiver;
establishing a subset of the set of virtual connections as active VCs;
establishing the remainder of the set of virtual connections as inactive VCs;
allocating the quota to subset of the set of virtual connections as a set of quotas;
establishing in dependence upon the remainder of the set of virtual connections, the difference between the quota and the bandwidth of the receiver and a maximum message transmission unit (MTU) a number N of short messages;
communicating the number N to the inactive VCs; and
communicating the set of quotas.

Other aspects and features of the present invention will become apparent to those ordinarily skilled in the art upon review of the following description of specific embodiments of the invention in conjunction with the accompanying figures.

DETAILED DESCRIPTION

The present invention is directed to data transmission via Internet Protocol and/or Ethernet and more particularly to systems, methods and architectures exploiting optical infrastructure to provide scalable loss tolerant Remote Direct Memory Access (RDMA) across a network with an emphasis on latency reduction.

The ensuing description provides representative embodiment(s) only, and is not intended to limit the scope, applicability or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment", "an embodiment", "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purpose only. It is to be understood that where the claims or specification refer to "a" or "an" element, such reference is not to be construed as there being only one of that element. It is to be understood that where the specification states that a component feature, structure, or characteristic "may", "might", "can" or "could" be included, that particular component, feature, structure, or characteristic is not required to be included.

Reference to terms such as "left", "right", "top", "bottom", "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including", "comprising", "consisting" and grammatical variants thereof do not preclude the addition of one or more components, features, steps, integers or groups thereof and that the terms are not to be construed as specifying components, features, steps or integers. Likewise, the phrase "consisting essentially of", and grammatical variants thereof, when used herein is not to be construed as excluding additional components, steps, features integers or groups thereof but rather that the additional features, integers, steps, components or groups thereof do not materially alter the basic and novel characteristics of the claimed composition, device or method. If the specification or claims refer to "an additional" element, that does not preclude there being more than one of the additional element.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application", an element of a "software suite", a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created).

Generally, within the following description with respect to embodiments of the invention an application is generally presented in respect of software permanently and/or temporarily installed upon a PED and/or FED.

As discussed above RDMA is process providing direct memory access from the memory of one computer (e.g. one server within a datacenter) into that of another computer (e.g. another server within the datacenter) without involving either one's operating system. Whilst solutions such as RoCE and iWARP, for example, have enabled RDMA implementations these solutions are typically employed in small scale networks. The sheer scale of the required RDMA networks presents a challenge within a datacenter where the number of servers can start in the thousands and range through tens of thousands to hundreds of thousands.

Several benefits of optical fiber have led to optical infrastructures exploiting wavelength division multiplexing (WDM) being employed within datacenter environments where they can provide per wavelength bandwidths of 10 Gb/s, 25 Gb/s, 40 Gb/s and above with per fiber bandwidths of 400 Gb/s, 1Tb/s and above. The result is that bandwidth within the datacenter is relatively cheap and easy to increase.

However, latency is a significant issue for many applications and accordingly the inventors have established a design methodology where the network prioritises latency over bandwidth. Embodiments of the invention exploiting lower bandwidth utilization can achieve latency near to that of an empty queue. Accordingly, the inventors have established a design methodology that addresses the scalability and latency issues of RDMA within a datacenter whilst addressing the core value-propositions for a RDMA network within a datacenter for the datacenter network owners, these being scalability, ubiquitous deployment, and maintenance-free operation.

Accordingly, the design goals the inventors targeted were:
RDMA networks supporting large scale deployment;
RDMA networks supporting ubiquitous deployment;
RDMA networks which are maintenance free;
RDMA networks which are "friendly" to multicast, incast, and unicast traffic;
RDMA networks that work with bottlenecks and what is referred to as "heavy tail" in their distributions through support and implementation of in-network priority, virtual local area network (VLAN) identities (VIDs), MultiProtocol Label Switching (MPLS) etc.

Accordingly, the priorities within the networks and network design methodology the inventors targeted were:
Simplicity of design is preferred over sophisticated design;
Latency has higher priority than throughput (e.g. input/output operations per second (IOPS)) which itself has higher priority than bandwidth utilization;
Signaling has higher priority than remote procedure calls (RPCs) which themselves have higher priority than short messages which themselves have higher priority than long messages (i.e. not all messages are equal).

Accordingly, the principles within the networks and network design methodology the inventors established were:
A decoupling between the layer-2 (L2) and layer-4 (L4) networks as whilst L2 is in principle lossless it is not scalable;
"Less is more" by establishing bandwidth headroom at a predetermined level (e.g. 10% of link capacity) to support signaling, RPC, and burst data; and
Connections and messages are load balanced with a priority etc. assigned to them.

Accordingly, to implement this methodology the inventors have established a loss-tolerant RDMA L4 architect with a layer-4 (L4) transport employing quota-based traffic control, message level load balancing and a global view of virtual connections over commodity switches that has simple priority queues.

The inventors therefore established a L4 (end-to-end) traffic control methodology where they introduce a Virtual Connection in addition to the previously defined, within the prior art, Reliable Connected (Connection) RC and Unreliable Connected (Connection) UC queue pair (QP) types. For a network with only L3/L2 equipment, this VC is equivalent to end-to-end Network Interface Card (NIC) QP connections. However, for a network with L4 equipment, this VC will have explicit bottleneck control in its data path.

The inventors further implement a built-in multicast tree aspect to the network to provide Reliable Datagram (RD) multicast which can support signaling, including but not limited to incast traffic control.

Accordingly, the network design methodology established by the inventors offers or exploits the following:
- "Reserved Resource" wherein a predetermined headroom within the bandwidth of each link is provided. Within the prior art Alizadeh et al. presented a HULL (High-bandwidth Ultra-Low Latency) architecture which sought to achieve low latency and high bandwidth utilization. In contrasts, the inventors "Reserved Resource" methodology as outlined below is based upon a novel receive-side or receiver-driven quota approach (methodology) which does not exploit the "phantom queue" concept within every switch to manage quotas as outlined in HULL.
- Transmitter side probes;
- Traffic shaping to provide smooth statistical fluctuation and enable Application layers to control transmitting according to their own rules and policies;
- A novel movement of the network "bottleneck" to the receive-side;
- Novel implementation of "Virtual Circuits" of Qualified Provider Networks within both RDMA and datacenters;
- Per-message load-balancing; which offers improved network utilization than per-flow load-balancing. The inventors note that TCP does not have message abstract.
- Performance objectives for network in real time of no-scheduling and empty buffers whenever possible; and
- Implementation of host based Shortest-Remaining-Processing-Time (SRPR) scheduling policy for heavy-tail traffic management.

As noted above datacenter networks are large scale and can range over orders of magnitude whilst growing to meet demand within the datacenter and accordingly the inventors design methodology provides not only a scalable solution but one that is ubiquitous within the datacenter and targeted at being maintenance-free.

It is known within the prior art that making a large-scale network lossless using L2 transport cannot be achieved. Accordingly, the inventors establish that the datacenter RDMA network should be loss-tolerant in L4, not lossless in L2. Whilst small to medium scale networks which are lossless in L2 can be established these are expensive in terms of maintenance and equipment. As such even fragmenting the network within the datacenter into multiple smaller networks whilst being lossless in L2 becomes expensive through this maintenance issue. This maintenance introduces substantial costs which present one of the major barriers to the ubiquitous deployment of RDMA.

Further, a Data Center Network (DCN) is typically implemented with equipment from multiple vendors and different batches of equipment even from each vendor individually. Further, the DCN has an ever changing topology with addition/removal of servers. Accordingly, the network methodology the inventors established were:
- Scalability: the networks can support not only current datacenters but larger datacenters with millions of connections per datacenter;
- Ubiquitously incremental deployment: where the network can support both a dynamic topology (as servers, racks, rack clusters etc. are added/removed) and dynamic equipment to support both multiple vendors and multiple batches/generations of equipment from each vendor;
- Maintenance Free: where the network works as servers, switches etc. are added/removed or the topology arbitrarily adjusted without addition work from network engineers as the network will still work no matter what they have done, potentially with reduced performance, but it works;
- Low Latency and High-Throughput: to support traffic within the datacenter arising from both computing and storage/data, i.e. hybrid traffic models, such that latency and IOPS throughput are drivers of the architecture and its real-time operation against the background that bandwidth is "cheap" in datacenters through the relative short link lengths support 10G, 40G, 100G and above WDM transmission protocols. Accordingly, the inventors targeted a design methodology for the DCNs that offers low loss for the high-priority message, is always loss-tolerant for all messages, is very low-loss for latency-sensitive traffic, and has low loss for giant messages. The DCN being robust to recover from loss when it occurs; and
- Message Level Load Balancing: The inventors exploit a VC based route optimization for simplicity.

Within the prior art loss tolerance within a L4 network has been demonstrated as offering improved performance. For example, Mittal et al. in "Revisiting Network Support for RDMA" proposed that selective retransmission with a Bandwidth Delay Product (BDP) would remove the requirement for L2 hop-by-hop congestion management, e.g. by exploiting Priority-based Flow Control (PFC), Explicit Congestion Notification (ECN) etc. This suggests the performance of L4 transport can be improved by removing these L2 congestion controls.

Further, Mittal employed the simplest BDP for simulation which whilst. being good enough for simulation purpose is, in the inventors opinion, too simple for a real world DCN. Without an explicit receiving or bottleneck bandwidth limit, in a network with some bottlenecks, BDP yields an unacceptable loss ratio. Further, this method treats all messages equally without using any priority in-network.

In contrast, the inventors employ a quota (a metaphor from import trade quota) control with a priority-based drop policy to implement RDMA within a large scale, ever dynamic topology, and maintenance-free DCN. This is based upon the principles that short messages are more sensitive to latency, thereby do not benefit from a network that establish an as low as possible loss-ratio, whilst some messages are tolerant to losing a few packets of a large message or long flow.

The inventors have also established that for ubiquitous deployment over many kinds of equipment and generations/batches of equipment, L4 and L2 need to be decoupled. Prior art networks exploit either centralized or distributed global view and optimization methodologies that introduce significant costs either in maintenance and/or planning. However, such centralized or distributed control is slower that local L2/L4 control. As the scale of the DCN increases the larger this performance gap becomes. Because it takes at least one round-trip time (RTT) to obtain data plus the computing time to make a decision or decisions. As the DCN increases to 100,000 nodes with interconnections then the computation delay cannot be ignored. Typically, L2/L4 control approaches are commonly referred to as "hop-by-hop" and "end-to-end" by virtue of their control methodology. However, the inventors also consider that the L4 control may be hop-by-hop where each element within the link has L4 functionality, e.g. a L4 switch. As buffer-credit-based lossless L2 control is known within the prior art to not be scalable adopting an asynchronous transfer mode (ATM) whilst giving up L2 control algorithm yields scalability and other benefits. Accordingly, decoupling the L2/L4 transport layers provides a scalable DCN and enables ubiquitous deployment.

Referring to Table 1 there are depicted alternate traffic control methods for a DCN based for varying congestion lengths.

TABLE 1

| Congestion Length | Congestion Mechanism | Implementation Method | Scalable | Incremental Deployment | Maintenance Free |
|---|---|---|---|---|---|
| Days - Hours | Network Planning | Human/Network Modelling | YES | Very Hard | All About maintenance |
| 10 ms - Seconds | Connection Admissions | Software Control (e.g. SDN. SONic) | YES | OK | Tools for Maintenance |
| 100 us - 10 ms | Dynamics Routing | Load-balance, L3/L4 (tuples) | YES | Easy | Possible but Often Fails |
| 10 µs - 100 µs | End-to-End Feedback | L4 congestion control | YES | Easy | YES |
| 1 µs - 10 µs | Hop-by-Hop Feedback | L2 Hop-by-hop PFC, ECN etc. | NO | Hard | NO |
| 10 ns - 1 µs | Buffering | L2 buffers | YES | YES | YES |

Notes:
SDN—software defined networking;
SONiC—open source network operating system based on Linux Notes: SDN—software defined networking; SONiC—open source network operating system based on Linux Accordingly, it is evident that congestion management can be implemented through a combination of Dynamic Routing via Load Balancing (L3/L4 tuples), End-to-End Feedback via L4, and Buffering via L2 buffers over congestion time lengths of 10 ns-10 ms. Using only End-to-End Feedback via L4, and Buffering via L2 buffers then maintenance free congestion management can be achieved over congestion time lengths of 10 ns-10 ms.

Accordingly, referring to Table 2 there are depicted comparisons of L4/L2 traffic control methodologies (traffic engineering) on different network protocols. Methods F to I are new approaches established by the inventors within the design methodology and implementation of DCNs according to embodiments of the invention.

TABLE 2

|   | Method | TCP | RoCEv1/v2 | LT-RDMA | IB |
|---|---|---|---|---|---|
| A | L2 Congestion Control Need | NO | PFC/ECN/etc. | NO | Hop-by-Hop Credit |
| B | L2 Needs to be Lossless | NO | YES | NO | YES |
| C | L2 Traffic Class | NO assumption | Unknown | Minimum High/Low | Unknown |
| D | L2 Loss Ratio | HIGH | No Loss | LOW | No Loss |
| E | L2 Buffer Status | Often Full | Used | Empty/LOW | Used |
| F | L4 Traffic Control | Push to loss | Timely, DCQCN etc., Go-back-N | Quota | NONE |
| G | L4 Eraser Code | NO | NO | Yes for Large Msg | NO |
| H | L4 Congestion Awareness | Loss, BBR Control Algorithm etc. | RTT, Loss, Queue status U(PFC, ECN). Etc. | Receiving Quota, with VC/MSG load-balance | NONE |
| I | Target Bandwidth Utilization | 100% Line rate | 100% line rate | Head Room. e.g. 90% line rate | 100% |
| J | Peak Bandwidth | Line rate | Line rate | Line rate | Line rate |
| K | Latency | High | Low | Low | Low |
| L | Throughput | LOW | High | High | High |
| M | Load Balance Granularity | Flow based (hours) | NO | Message based (µs - ms) | ?? |
| N | Out-of-Order | High cost | Very High Cost | Tolerant | Very High Cost |

Notes:
BBR (Bottleneck Bandwidth and Round-trip propagation time);
DCQCN (Data Center Quantized Congestion Notification)

Notes: BBR (Bottleneck Bandwidth and Round-trip propagation time); DCQCN (Data Center Quantized Congestion Notification)

The inventors have established that improved performance with respect to reducing latency within large scale RDMA networks such as those required for DCNs is achieved with an architecture that employs a "no-schedule" methodology.

Research within the prior art indicates that a no-schedule methodology offers better latency when it works. Accordingly, the goal for the networks according to embodiments of the invention is to improve the resiliency of the no-schedule methodology. This research is consistent with the intuitive viewpoint as scheduling requires additional computing resources, additional information collection, and decision assignment time. The inventors note that even for current NICs with latency below 10 μs that this extra scheduling time is already noticeable.

A simple High/Low threshold message size threshold can be established to achieve lower average flow completion time employing first come—first served (FCFS) processing versus shortest remaining processing time (SRPT) where messages below the H/L threshold are always served before those above the H/L threshold. As such a simple High/Low priority queue is sufficient to achieve optimal non-scheduling performance which is better than current scheduling algorithms. In a network of average load <100%, the H/L threshold can always be defined. Accordingly, the inventors inventive networks are defined based upon a maximum traffic load threshold below 100%, e.g. 90%. Such a design methodology is also a good match to "quota-based flow control" to achieve less than 100% utilization.

Virtual Connections and What It Bottleneck Means: L4 within the popular RDMA over Converged Ethernet (RoCE) is connection orientated but at this point there is no connection management within the overall DCN. Accordingly, the inventors introduce the concept a Virtual Connection. Virtual Connections according to embodiments of the invention are based upon global Queue Pair Number (QPN) spacing that offers a global view of RDMA in a domain (e.g. a datacenter) which offers services that need a global view, e.g. live-migration; and potentially other global optimizations, the requisite global view. QPN being an abstraction of a delay tolerant network. As the QPN spacing is about $2^{24}=16,777,216$ then this is sufficient for a DCN with up to approximately 16 million end-points, e.g. servers.

As one of the goals of the inventors is ubiquitous incremental deployment, the switch network cannot always be a fully-configured non-blocking Clos network, as in the process of adding servers, it could be over subscribed. Prior art research indicates that over-subscription happens frequently in DCNs. When the network is over-subscripted, a bottleneck is unavoidable.

With over subscription there is at most one bottleneck in each VC. If bottlenecks are equal then network planning and management tools, e.g. SDN, can always make one of them be smaller. Within embodiments of the invention within any VC, management tools such as SDN etc. can assign any equipment in between the end points to be the bottleneck. Further, within embodiments of the invention the receivers can be assigned as the bottleneck when the transmitter/receiver elements are the only L4 equipment in that VC. Further, in a VC there will be uneven bandwidth of one segment of the VC to another such that within embodiments of the invention RDMA L4 equipment is introduced to manage that bottleneck. This is particularly true when the RTT is too long or a bottleneck happens too often.

The existence of a bottleneck is a basic assumption behind the traffic control method BBR (Bandwidth Bottleneck Rate). If there is no bottleneck in a VC, then the BDP (Bandwidth Delay Product) would be good enough for traffic management. However, the inventors design methodology is based upon the argument that the receiving side shall be the only bottleneck because the message is only useful if the receiving side is capable of receiving (absorbing) it. Accordingly, in order to optimize the network topology for over-subscribed networks, the L4 equipment can be introduced as a virtual L4 destination/source which behaves as a receiver.

As noted above bandwidth can be easily increased in a datacenter environment. With the ongoing price reductions optical equipment, this is becoming equally valid in the metro and campus networks as well. As such whilst the methodologies presented within embodiments of the invention are described and depicted with respect to DCNs they may be applied to other large scale Metro and Wide Area Network (MAN/WAN) RDMA networks.

Further, the inventors note that latency is important for many RDMA applications, and accordingly the latency and tail latency are set as a priority first within exemplary networks according to embodiments of the invention, and throughput (message ratio) is set as a second priority. Utilization/bandwidth is set as a third or lower priority.

The basis for this is that setting bandwidth as a priority introduces a mean latency and even worse tail latency. With a lower target utilization, e.g. 90%, the inventors noted through simulations and analysis that the drop ratio and latency are improved. Further, with a less than 100% target utilization this allows a very simple priority queue policy to be employed within in a switch which reduces the loss ratio of low-priority messages and avoids loss for high-priority messages. Further, the inventors note that with the TCP service DCN utilization cannot be high because of the transmission repeat when a packet was lost.

Accordingly, within embodiments of the invention the inventors employ a low complexity dual priority traffic control method. The method allows low priority messages to have over-commitment but maintains high priority messages as having no over-commitment. Referring to Table 3 below it is evident that total utilization can be maintained at around 80% even most of the messages are latency-sensitive. Accordingly, within an embodiment of the invention all messages could be assigned as high priority if the switch does not support the priority queue in conjunction with a more conservative summary of VC quota(s) assignment (e.g. 90%).

TABLE 3

| High Priority | | Low Priority | | |
|---|---|---|---|---|
| Bandwidth Share | Utilization | Bandwidth Share | Utilization | Total Utilization |
| 10% | 50% | 90% | 90% | 86.00% |
| 20% | 60% | 80% | 90% | 84.00% |
| 30% | 60% | 70% | 90% | 81.00% |
| 40% | 65% | 60% | 90% | 80.00% |
| 50% | 70% | 50% | 90% | 80.00% |
| 60% | 80% | 40% | 90% | 84.00% |
| 70% | 80% | 30% | 90% | 83.00% |
| 80% | 80% | 20% | 90% | 82.00% |
| 90% | 80% | 10% | 90% | 81.00% |
| 100% | 80% | 0% | 90% | 80.00% |

Accordingly, the design methodology of the inventors is based upon the following principles.

L4 Loss-Tolerant vs. L2-Lossless: Embodiments of the invention exploit L4/L2 decoupling where the L4 does not assume any L2 congestion control capability. Further, the networks do not exploit PFC, L2-credit, or ECN. In this manner a network operator can add L4 traffic control features and L2 switch equipment arbitrarily based upon any agenda and/or demand. If every element of equipment within the DCN has an L4 traffic-control feature (i.e. a virtual source destination), then, the L4 end-to-end traffic control methodology can be replaced with the equivalent of a hop-by-hop L4 traffic control between elements of equipment.

Common Priority: Embodiments of the invention exploit a priority schema which is supported by all commodity Ethernet switches employed within the DCN. Fundamentally, messages are not created equal as some messages are more sensitive to latency whilst others only care about throughput. Accordingly, a simple dual class priority based scheme may be implemented within embodiments of the invention.

For RDMA messages, the inventors assume that shorter messages, e.g. 64 bytes versus 256 bytes versus 1024 bytes etc., are increasingly sensitive to latency and package drop whereas large messages have higher-tolerance to latency and package drop. A threshold can be calculated within embodiments of the invention directly within the receiving side based on the VC and communicated to those nodes communicating with it (e.g. the threshold can be dynamically set per VC). This simple method cannot be employed in TCP network because it lacks message abstraction. TCP is built upon a contiguously endless byte-stream.

Alternatively, within embodiments of the invention the threshold may be defined within a central controller based upon a global view such that the threshold applies to the entire DCN.

Alternatively, within embodiments of the invention the threshold may be defined by a set of distributed controllers based on a global view such that the threshold applies to the DCN.

Alternatively, within embodiments of the invention the threshold may be defined by a set of distributed controllers based on localized views for each distributed controller such that the threshold applies to that portion of the DCN associated with that distributed controller.

Less is More: Embodiments of the invention exploit a quota to ensure that, at any point in time, the load is less than 100% (as evident from Table 3 typically about 80%). Although peak utilization is important, the average network utilization is not a priority. It would also be evident that exploiting a methodology such as TCP's push-to-loss method does not increase the utilization because of the drop of bandwidth after a loss; so ironically, targeting full utilization actually yields lower network utilization.

Bottleneck Happen: Embodiments of the invention assume that bottlenecks will occur, primarily either in the transient or in the process of scaling. The inventors within embodiments of the invention assume that in every VC, there is at most a single bottleneck defined by the receiving side such that other bottlenecks are considered as secondary bottlenecks. Accordingly, the rate limitations of these other bottlenecks are smaller than the rate limitation from the bottleneck of the receiving side. Accordingly, the bottlenecks may be considered to be associated with each L4 Destination/Source pair (DST/SRC or also denote as SRC/DST). It is further assumed that a transmitter always has a loss signal to establish convergence to its quota such as IRN, TCP, BBR etc. for example.

Load Balancing—Granularity Matters: Accordingly, factors such as latency loss ratio, throughput etc. are not considered as these direct affect the network utilization which is defined within embodiments of the invention as not important or a factor to which network planning/decisions/quotas etc. are not directed. Rather load balancing is driven by utilization. Within the prior art it is known that per-packet load balancing balances loading better than per-flow balancing. However, per-packet load balance introduces the issue of out-of-order packet sequencing which is difficult to manage for TCP. In particular, the TCP conversion avoidance algorithm FAST TCP (also known as FastTCP) treats out-of-order packets as loss, which makes the per-packet load-balance practically difficult to deploy.

However, the inventors have established that the RDMA L4 transport provides a message abstraction which has improved granularity allowing improved performance over that of flow balancing. As per-message load balancing improves traffic balancing over per-flow balancing then as RDMA L4 always has the message information it can address the issues of out-of-order packets etc. Accordingly, RDMA L4 can use strategies such as Equal-Cost Multi-Path (ECMP) routing for example at the message layer. Accordingly, the embodiments of the invention established by the inventors mean that out-of-order packets from the message do not impact the RDMA process. Accordingly, embodiments of the invention allow messages to be managed at different granularities according to the DCN dynamics without impacting the overall process.

Quota Based Traffic Control: Embodiments of the invention established by the inventors exploit quota based traffic control for the L4 based upon credit-of-receiving-rate for the L4 RDMA switch/equipment managing the VC traffic. Where a RTT becomes too long then the network configuration can dynamically add, or have installed, a RDMA L4 enabled switch.

As discussed above the design premise of the DCN according to embodiments of the invention is that the DCN can only transport the traffic that the receivers are capable of accepting. Further, the closer to a receiver that traffic loss occurs the more expensive it is. Accordingly, the inventors novel networks according to embodiments of the invention exploit traffic controls based upon the absorbable rate of the receivers.

Within embodiments of the invention the quota defined by the inventors is defined and calculated differently from the common Rate/Credit concept within the prior art. The quota is not a credit-of-queue and it is also different from concepts such as bandwidth-delay product (BDP) based rate control as known in the prior art. Rather, the inventors define a credit-of-rate, or in other words, the ingress quota of the receiving side (quota-of-rate). Accordingly, the inventors have established within embodiments of the invention a quota algorithm. The quota algorithm comprises the following steps:

1. Create Queue Pair (QP) for Virtual Connection (VC) wherein:

The transmitter applies a quota-of-rate to both low and high priority traffic where the application the transmitters demand for rate and its usage of time probability.

The receiver calculates the quota (rate, inflight) based upon a summation (Sigma) established from the actual performance of the QP/VC for this VC # where:

(Sigma Quota-VC #)×(traffic-probability-VC #) is less than 100% for high priority traffic;

(Sigma Quota-VC #)×(traffic-probability-VC #) can be greater than 100% for low priority traffic for improved network utilization.

If the transmitter cannot obtain a rational value for (traffic-probability-VC #) then it may default the (traffic-probability-VC #) to either a predetermined fault value or one derived from another source, e.g. from the synchronous data network (SDN) providing the link for the QP/VC.

The receiver generates and responds to the transmitter for its QP with a quota allowing the transmitter to build a Virtual Connection (VC)/Virtual-Queue Pair Network (V-QPN).

2. Establishment of QP/VC: Based upon the receiver communications back to the transmitter for the QP/VC then the transmitter starts sending immediately wherein:

The transmitter send a high priority message at a predetermined ratio of the established quota with the receiver, e.g. 0.9×Quota.

The transmitter adjusts low priority message rate based upon a factor, for example either an established loss of the QP/VC link or the RTT delay (which provides an indication of buffer depth).

3. Dynamically Adjust Quota: As the QP/VC link is maintained then the process continues by:

The transmitter dynamically applies increases or decreases to the quota based upon data received from the receiver.

The receiver dynamically adjusts the quota provided to each transmitter communicating with it as part of one or more QP/VCs based upon applications being executed.

The transmitter only increase the rate if a higher quota is assigned from the receiver.

However, the transmitter can decrease the transmitting ratio immediately upon its own decision to do so.

4. Finish QP/VC: Within this part of the algorithm:

Upon completion of a QP/VC then the QP/VC quota assigned to transmitter from the receiver is released.

The receiver adjusts the quota for other alive QP/VCs based upon the released quota.

Accordingly, the receiver assigns a quota based upon Equation (1) below where K is a predetermined factor and BW is the bandwidth of the receiver. For example K=0.9.

$$\Sigma_i^k Rate_i = N \cdot BW \tag{1}$$

$$BW(Inactive\ VCs) = (1-N)BW \tag{2}$$

Accordingly, the remaining receiver bandwidth defined by Equation (2) is reserved for inactive VC short messages, over-load absorption etc. Within embodiments of the invention a receiver may simply divide the predetermined factor by the number of active VCs so that all VCs have equal share or it may assign different shares to different VCs according to one or more factors, such as the application associated with the VC. For example, a VC associated with computing may be given higher share than a VC associated with moving data.

Accordingly, active VCs proactively reduce rate unless provided with an improved quota to increase rate to the receiver.

Accordingly, inactive VCs can immediately send up to a predetermined number, N, short messages (maximum transmission unit, MTU). The value of N is calculated by the receiver. If an inactive VC wants to send more than N short messages then it must send N first, await RTT to establish it as an active VC wherein it is allocated a quota from the predetermined factor N. The inactive VC may indicate to the receiver that is has more than N messages and wishes to become an active VC.

It would be evident that this can support a massive number of VCs. For example, assuming 20,000 VCs, an MTU of 1 KB (equal to 8 Kb), and N=10 MTUs then the bandwidth consumed by these is given by Equation (3). If, BW=25 Gb/s and N=0.9 then the resulting 1.6 Gb/s is less than the reserved bandwidth of 2.5 Gb·s (25 Gb/s*(1−N)).

$$Inactive\ VCs = 20,000\ 1,000\ 10\ 8 = 1.6\ Gb/s \tag{3}$$

Within embodiments of the invention the design is based upon the fact that for L4 multicast the bottleneck is receiving and that overlay multicasts are viewed as unicast for L4/L2. Incast is the sum of all VCs casing to a single receiver which is again limited by receiver so that receiver driven quota management/traffic shaping supports incast and multicast/unicast.

It would be apparent to one of skill in the art that the proposed algorithm employs a quota based link control rather than the control based upon acknowledgements within prior art RDMA solutions. However, it would also be evident that the quota may be employed in conjunction with such prior art acknowledgement techniques such that the transmitter whilst having a quota only transmits upon the acknowledgement as then it knows the receiver can receive the data.

Within the above algorithm RTT may be employed to provide an indication of buffer depth. It may also provide a value of data "in-flight." However, the inventors note that this indication becomes less certain when the router/switch delay is large and accordingly a mechanism is required for the transmitter/receiver to establish the "Time of Flight over Fiber Delay" whilst assuming buffers are empty, as a buffer does not increase in-flight capacity but merely acts to smooth bursts in traffic. Estimates by the inventors suggest that the overall delay could be twice that of the fibre-capacity.

Within embodiments of the invention this RTT may vary and accordingly taking a minimum RTT may be incorrect, especially if the QP/VC route changes. The inventors within embodiments of the invention assume that the RTT is the minimum observed on a per message basis as a basis for this buffer depth determination as generally a route will only change after a message is finished. However, it is noted that RTT may be difficult to obtain when messages are short.

It would be evident that as the quota based mechanism is from the receiver side that it can assign a quote to each transmitter transmitting to it as part of a VC. Accordingly, as the transmitters are limited to the quote provided from the transmitter then this mitigates the issue of multiple VCs all having a surge of transmission together which would present the scenario that buffers could be overflow and even high priority packet data could be dropped. Accordingly, the inventors establish that the summed quota a receiver can indicate is a predetermined ratio of its maximum datarate such that where RTTs are long then delays in the transmitters adapting to a new quota can be accommodated by virtue of the receiver having a buffer in maximum acceptable data rate.

Within embodiments of the invention the inventors establish as outlined above for each VC a message-based load balancing scheme. This message-based loading provides a granularity between that of flow based balancing and packet based loading whilst reducing the impact of out-of-order packets within the L4 traffic. However, the inventors notes that alternatively a methodology may be established based upon use of a global QPN instead of the User Datagram Protocol (UDP) port for ECMP etc. via tuples.

Optionally, within embodiments of the invention a VC may exploit a dedicated signaling channel with very low utilization ratio. For example this may exploit:

The built-in binary tree in each Network Interface Controller (NIC) as this provides a reliable datagram for multicast services.

The signaling channel may support scheduling or it may not support scheduling as this is complementary to the fact that the embodiments of the invention via L4 support out-of-order packets for messages.

Load balancing is orthogonal and complementary to quota based link control.

Electronic switches within a DCN already support queues which allows for a VC to support and manage an over-subscription of quota. In the event of an over-subscription then the low priority queue is dropped as the loss of low priority message/flow is acceptable within the DCN design goal of minimizing latency.

Optionally, embodiments of the invention may support a centralized arbiter or distributed arbiter to adjust the quotas between multiple VCs to a receiver based upon the priorities/traffic from the multiple transmitters.

Within embodiments of the invention the inventors employ selective retransmission in order to provide loss-tolerant L4 within the DCN and allow for recovery. The inventors further introduce out-of-order receipt upon the receiving side.

Within embodiments of the invention the inventors the DCN supports over-commitment for low-priority messages to improve the average network utilization. The inventors employ in-network priority to achieve this. Further, within embodiments of the invention the inventors transmit short messages "blindly" i.e. without any bidirectional link communications, once the VC is established. Within embodiments of the invention the inventors scheduling is simplified as sophisticated scheduling algorithms whilst increasing utilization are less optimal for latency reduction.

Accordingly, within embodiments of the invention the inventors the simply establish two classes of in-network priority on the basis that First-In First-Out (FIFO) exhibits improved performance relative to scheduling algorithms where latency reduction is a design goal. Within embodiments of the invention this may be implemented, for example, using the open source Data Plane Development Kit (DPDK). The inventors define priority on size but leverage message size information built into the RDMA message to setup the requisite priority in transport for the RDMA L4 and leave the application layer free. Within embodiments of the invention the inventors the quota scheme ensures that the high-priority network load is less than 1 (100%). This ensures that the loss of high-priority messages or message data is low. Within embodiments of the invention the inventors the DCN operates with a no-schedule priority scheme. An example of such a scheme being given within Abbasloo et al. in "To schedule or not to schedule: when no-scheduling can beat the best-known flow scheduling algorithm in datacenter networks" (arXiv:2001.08253v1, January 2020).

Within the prior art BBR employs bottleneck measurement and BDP employs full quota-inflight-product for traffic control. Neither are receiver driven nor RDMA based nor consider in-network priority. In contrast, within embodiments of the invention the inventors where a bottleneck is present in the network then their receiver side driven quota-based-traffic addresses this from the viewpoint of quota, not link bandwidth.

Within the prior art asynchronous transfer mode (ATM) was designed for high performance and large scale exploiting two traffic control methods, credit based or ratio based, with ratio-based control being dominant. However, within embodiments of the invention the inventors analysis and simulations indicate that their receiver side quota-based traffic control offers the same scalability and performance potential as that of ATM but for RDMA within a DCN.

Within embodiments of the invention the inventors the design of the DCN is based upon establishing the network utilization to be less than one (<1). It does not matter how aggressive the transmitter is, the total load is less than one and the push-to-loss mode of TCP only reduces network utilization. Accordingly, within embodiments of the invention the inventors ensure that the utilization is <1 and employ a no-schedule transmission methodology.

Within the prior art "pHost" (see "pHost: Distributed Near-Optimal Datacenter Transport Over Commodity Network Fabric" Gao et al.) proposes priority-based L2 scheduling for implementation within switches. pHost is a distributed approach and may be implemented in addition to the embodiments of the invention described by the inventors within this specification.

Similarly, within the prior art "Fastpass" (see "Fastpass: A Centralized "Zero-Queue" Datacenter Network" Perry et al.) a centralized approach to control is outlined. The inventors note that this requires a centralized arbitrator and that accordingly the scale of the DCN is thereby limited by the capability of the central arbitrator. However, the inventors note that whilst the central arbitrator is too slow for packet level scheduling it may be implements for policy decisions requiring a global view of the DCN. The inventors would argue that the same is true with decentralized arbitration using multiple arbitrators although these may provide localized policy decisions and data to a central arbitrator for global DCN policy decisions.

Accordingly, whilst embodiments of the invention support growth in traffic to receiver which is faster than prior art methodologies such as TCP and BBR they also remove the inherent fluctuations of bandwidth within these methodologies.

Further, as embodiments of the invention allow for immediate transmittal of short messages the DCN operates with nearly empty switch buffers and achieve latency near that of the optical fiber latency itself.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alpha-numeric input unit such as a keyboard, a pointing control device such as a mouse, and so forth.

The memory includes machine-readable code segments (e.g. software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method comprising:
   determining a bandwidth of a receiver within a network;
   establishing a predetermined factor of the bandwidth of the receiver as a quota;
   establishing a set of virtual connections (VCs), each VC of the set of VCs between a predetermined transmitter and the receiver;
   establishing a subset of the set of virtual connections as active VCs;
   establishing the remainder of the set of virtual connections as inactive VCs;
   allocating the quota to subset of the set of virtual connections as a set of quotas;
   establishing in dependence upon the remainder of the set of virtual connections, the difference between the quota and the bandwidth of the receiver and a maximum message transmission unit (MTU) a number N of short messages;
   communicating the number N of short messages to the inactive VCs; and
   communicating the set of quotas to the active VCs.

2. The method according to claim 1, wherein each inactive VC can send up to the N short messages to the receiver without any scheduling.

3. The method according to claim 1, wherein each inactive VC can send up to the N short messages to the receiver without any scheduling; and
   if an inactive VC has more than N short message for the receiver it executes a process comprising the steps of:
      sending the N short messages;
      indicating to the receiver that it has either more than N messages or that is wishes to become an active VC;
      waiting for a quota from the receiver; and
      sending the remainder of the short messages as an active VC.

* * * * *